F. TRIEST.
WARNING INDICATOR FOR VEHICLES.
APPLICATION FILED FEB. 3, 1914.

1,147,829.

Patented July 27, 1915.
3 SHEETS—SHEET 1.

WITNESSES:
Albert R Bronner
S. Constine

INVENTOR.
Frank Triest
BY
Wm. F. Booth
ATTORNEY

F. TRIEST.
WARNING INDICATOR FOR VEHICLES.
APPLICATION FILED FEB. 3, 1914.

1,147,829.

Patented July 27, 1915.
3 SHEETS—SHEET 3.

WITNESS
Wm. F. Drew.
S. Constine.

INVENTOR
Frank Triest
by Wm. F. Book
ATTORNEY

UNITED STATES PATENT OFFICE.

FRANK TRIEST, OF SAN FRANCISCO, CALIFORNIA.

WARNING-INDICATOR FOR VEHICLES.

1,147,829.  Specification of Letters Patent. Patented July 27, 1915.

Application filed February 3, 1914. Serial No. 816,176.

*To all whom it may concern:*

Be it known that I, FRANK TRIEST, a citizen of the United States, residing in the city and county of San Francisco and State of California, have invented certain new and useful Improvements in Warning-Indicators for Vehicles, of which the following is a specification.

My invention relates to the general class of annunciators, and particularly to those devices adapted to indicate information in the nature of a warning.

My invention is intended for use in connection with vehicles, particularly automobiles, and its object is to announce or indicate such intentions of the driver as may be advisable for the drivers of following vehicles to know. This information may be of any suitable character; for example, the intention of the driver to turn to the right, or to the left, or to stop, and also to positively direct attention to such indicated intention. In these terms I shall herein describe and illustrate my invention, though it will be understood that I do not confine myself to such particular information.

My invention, therefore, consists in the novel warning-indicator for vehicles and in its novel construction, arrangement and combination of parts, which I shall now fully describe, by reference to the accompanying drawings, in which—

Figure 1:
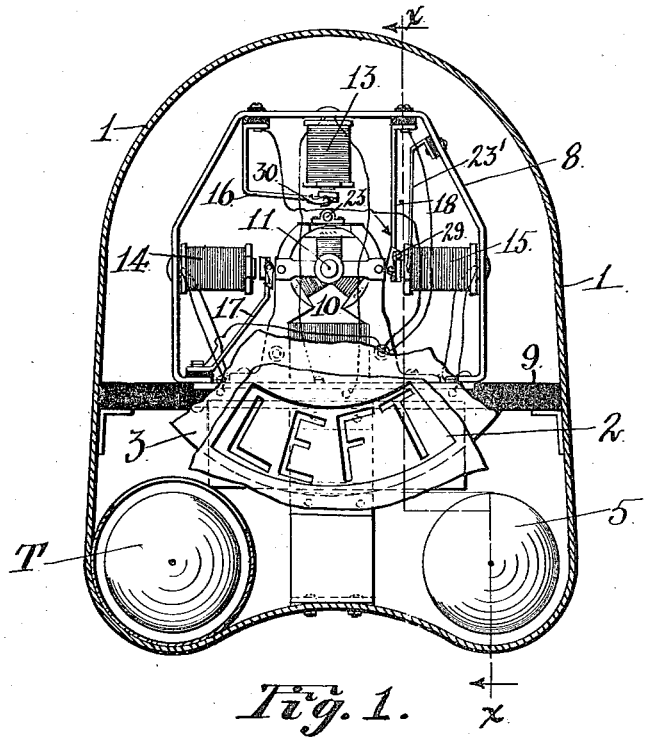
Figure 2:
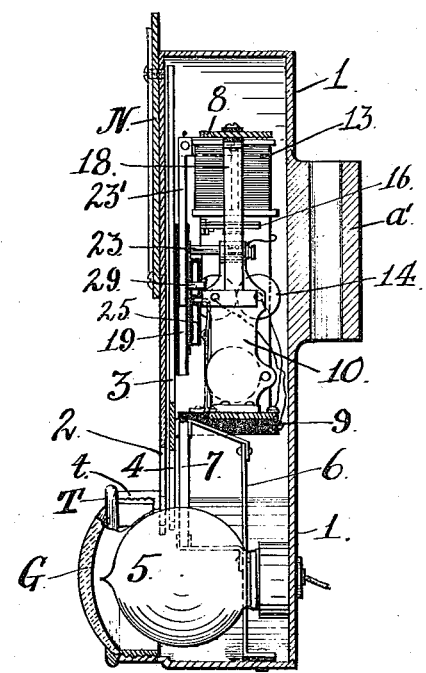
Figure 3:
Figure 4:
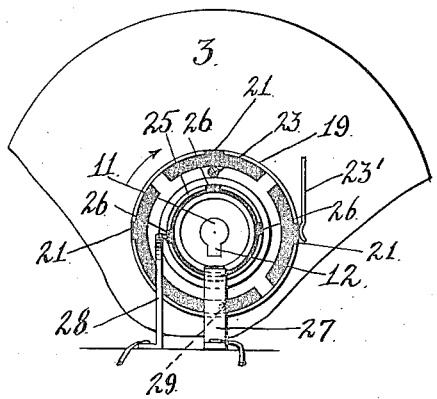
Figure 6:
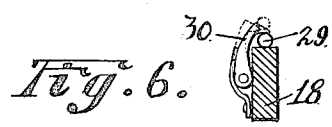
Figure 5:
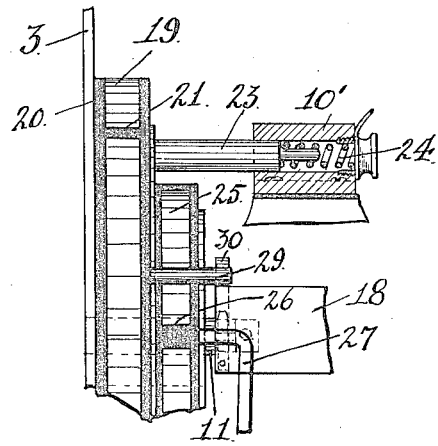
Figure 7:
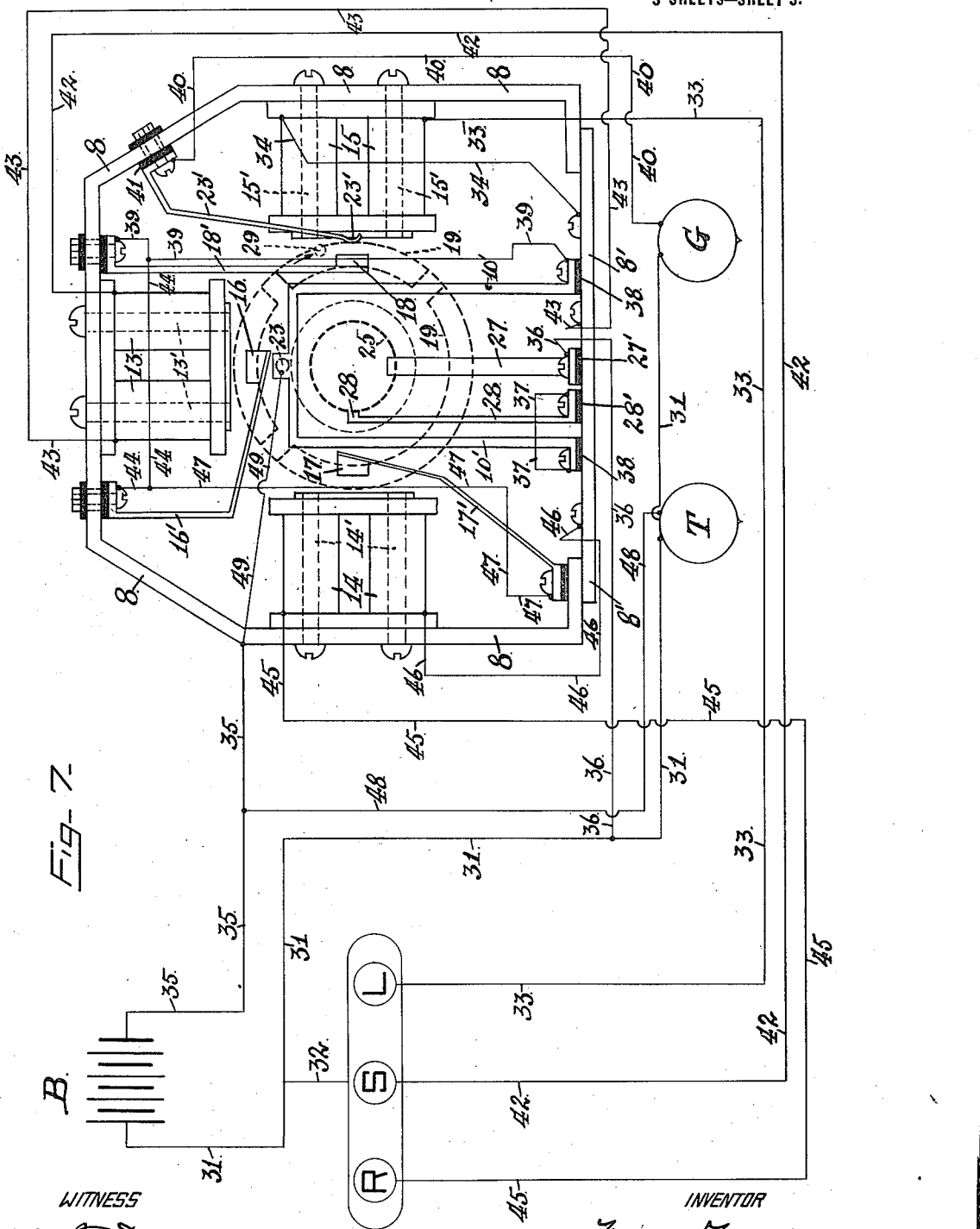

Figure 1 is a front view, broken in part, of my indicator. Fig. 2 is a section on the line *x—x* of Fig. 1. Fig. 3 is a front view of the warning or announcing disk. Fig. 4 is a rear elevation, broken, of the same. Fig. 5 is an edge view, enlarged and broken, of the warning disk, and of the lighting and motor controls in connection therewith. Fig. 6 is a detail of the catch for holding the warning disk steady when thrown to indicating position. Fig. 7 is the general wiring diagram.

The warning indicator is to be carried on the rear of the vehicle in suitable manner.

1 is the case of the indicator having a rear socket *a'* as seen in Fig. 2 for fitting it to the vehicle. The case carries at one of its lower corners a red-light lamp T, and at the other lower corner a lamp G, giving rearwardly through a glass or color screen a light of a different color to attract attention, say, for example, green.

The case 1 has secured to its upper portion the license number plate N, and the top of the lamp T has its shell left open to direct the light upward to illuminate the number plate, as is shown at *t* in Fig. 2. The face of the case 1, just above the two lamps is provided with a sight opening 2, through which the several inscriptions of the warning disk may be seen as selectively controlled by the driver.

Within the case 1 is the warning or announcing disk 3. This disk is mounted to receive partial rotation on its axis, and it carries on its face the several inscriptions predetermined by the manufacturer. For example, I have here shown, by reference to Fig. 3, these inscriptions as being "Right", "Stop", "Left". These inscriptions are so disposed that by the rotation of the disk, any one, according to the will and selection of the operator, will be made to appear and come to rest behind the sight opening 2 of the case. Thus, in Fig. 1 I have shown the word "Left" as so appearing. The inscriptions may be made upon the plate in any suitable manner, but in their best form, they are perforated or cut out of the disk, as shown at 4 in Fig. 2, and as indicated in Fig. 3, the intention being to provide for their illumination and consequent greater attractiveness, by means of light directed behind them from the light source of the lamp G. This is clearly seen in Fig. 2, wherein the light-bulb 5 of the green lamp G directs its white light upon a fixed reflector 6 mounted within the case 1, and by which the light is reflected forward and transmitted through an opalescent glass 7 mounted immediately behind the cut-out inscription of the disk, when said inscription appears behind the sight-opening 2.

Before proceeding to describe the motor and lighting controls, it will be well to set forth the general operation of the indicator. When the operator wishes to indicate that he intends to turn to the left, he causes the rotation of the disk 3, to such an extent that the word "Left" will appear in the sight opening 2, as is shown in Fig. 1. At the same time, he causes the lamp G to light up, so that by its rearwardly directed green light it attracts attention, and by its interior white light, it illuminates the word "Left." Then the disk 3 returns to normal neutral position with its blank face showing, and the light G goes out. When he means to turn to the right, he so operates the disk that the word "Right" shows up in like manner; and so, also, he shows up the word "Stop." To realize these several operations, the following electrical connections are provided:

8 is a frame carried within the case 1 on an insulating base 9, as seen in Figs. 1 and 2. Upon base 9 is carried an electric-motor 10, of which 11 is its shaft. The warning disk 3 is fixed upon and is rotated by the motor shaft 11. The disk 3 is intended to return to normal neutral position, by gravity, and for this purpose it may itself be directly counterbalanced to this end, or, as I have shown in Fig. 4, the motor shaft 11 may have a weight extension 12, which will return it and the disk to normal or neutral position.

The frame 8 carries the several light-coils, one marked 13 for use in connection with the inscription "Stop"; one, 14, for "Right"; and one, 15, for "Left."

16 is the armature for the coil 13; 17 is the armature for the coil 14 and 18 is the armature for the coil 15. These are carried by and insulated from the frame 8 as seen in Figs. 1 and 7. Upon the back of the warning disk 3 and carried thereby, as seen clearly in Figs. 4 and 5, is a control disk 19 for the lighting. This disk is insulated from the warning disk at 20, and its periphery is crossed at three places by insulating breaks 21, corresponding in position to the positions of the warning inscriptions on the disk 3. In the top of the motor frame 10' is carried a contact pin 23 affected by a spring 24 to make continuous contact with the inner face of the disk 19. A spring contact brush 23', shown in Figs. 4 and 7, bears on the periphery of the disk 19, said contact being, as shown in Figs. 1 and 7, connected up above in the lighting circuits.

Secured to and insulated from the control disk 19 of the lighting control is the control disk 25 of the motor circuit. This disk has three insulating cross breaks 26 on its periphery corresponding to the three positions of the warning disk. A continuous contact brush 27 bears on the face of the disk 25, while a spring contact brush 28 bears on its periphery.

Secured to and projecting inwardly from the disk 19 is the stop pin 29. Its position is such that in the circular path it describes it will pass between the several armatures 16, 17 and 18 and their respective coils 13, 14 and 15 as is indicated by the dotted circle in Fig. 7. But if any one of said armatures be drawn to its coil, the face bar of said armature will lie in the path of the stop pin 29, as shown in Fig. 5, and particularly in Fig. 1, in connection with the armature 18 and coil 15. This Fig. 1, thus shows that when the pin 29 is stopped by the armature 18, the word "Left" is shown at the sight opening 2. In like manner if the armature 16 be drawn into the coil 13, the pin 29 will be stopped at a point which enables the warning disk 3 to show up the word "Stop"; and, so, also, if the armature 17 stops the pin 29, the word "Right," will be displayed.

In order to keep the warning disk 3 from rebounding upon the sudden check of its rotation, I fit upon the face bar of each armature 16, 17 and 18 a small spring controlled catch 30, as shown in Fig. 1. This catch is also shown in Fig. 6. Its beveled head is such that the stop pin 29 presses it back, as shown in dotted lines, and then the catch springs over said pin, as shown in full lines. When the armature drops back it carries the catch with it, and the pin is released, so that the warning disk 3 is free to spin back to the normal by gravity.

In Fig. 7 which shows the wiring diagram, the battery is B. R is the push button for the "right" warning of the disk 3. L is the push button for the "left" warning, and S is the push button for the "stop" warning. These buttons are to be located conveniently upon the automobile A. Referring to Fig. 7, let us suppose that we press the button L. The circuit now established is from one side of the battery B, through the leads 31 and 32 to the button L; thence, by the lead 33 to the lower coil of the magnet 15; thence from the upper coil of said magnet, by the lead 34, to the bottom plate 8' of the frame 8; and thence from the upper left hand portion of said frame, by the lead 35, back to the other side of the battery B. The magnet 15 being now energized by this circuit, draws to it the armature 18. The contact of the armature with the magnet switches in the motor circuit, which is as follows:—from one side of the battery by the leads 31 and 36 to the contact brush 27, which is insulated at 27' from the bottom plate 8' of the frame 8; thence through the brush 27 to the motor disk 25; thence from said disk to the peripheral contact brush 28; thence through said brush 28, the base of which is insulated at 28' from the bottom plate 8' of the frame 8, to the lead 37, and by said lead to the motor frame 10' which as shown at 38 is insulated from the bottom plate 8' of the frame 8; thence from the motor frame 10' by the lead 39 to the top of the shank 18' of the armature 18, said shank being insulated, as shown, from the frame 8; thence through said armature and the core 15' of the magnet to the frame 8, and, thence, from said frame by the lead 35 to the other side of the battery. Thereupon the motor rotates and carries the warning disk 3 around until the stop-pin 29 comes in contact with the drawn-in armature 18, as shown in Fig. 1, and this position is that which displays the word "Left," as seen in said figure. As the motor circuit is closed as just described, a circuit to the green lamp G is established as follows:—from the battery B, through the lead 31, to the green lamp, and from said lamp, through the lead 40 to the contact brush 23' which, as shown, is insulated from the frame 8 at 41; thence, through said brush 23' to the periphery of the disk 19, and from said disk through the contact pin 23 and lead 49 to the frame 8, and thence back to the battery through the lead 35. Thus the green light shows up to attract attention while the white rays of this lamp are directed for a moment to illuminate the word "Left" as it appears. Now, the moment of the appearance of the word "Left" is about coincident with the automatic breaking of the motor and lighting circuits, wholly independent of the will of the operator, and whether he releases the push button or not, so that the battery is not unduly drawn on. The motor break is effected by the proper one of the cross breaks 26 of the disk 25 reaching the spring contact brush 28 and similarly the light break is effected by the proper one of the cross breaks 21 of the disk 19 reaching the spring contact brush 23'. When these circuits are thus broken, the light of the lamp G goes out and the warning disk 3 swings back by gravity to normal neutral position. In like manner the other push buttons operate. For example, by referring to Fig. 7, the circuits established by the button S are, from the battery by the leads 31 and 32 to the button; thence from the button, by the lead 42 to the magnet 13; thence from the magnet, by the lead 43 to the bottom plate 8' of the frame 8, and from the frame through the lead 35 back to the battery. The armature 16, being thus drawn to the magnet 13, the motor circuit is closed, through the leads 31 and 36 to the contact brush 27; thence through the motor disk 25 and out through the contact brush 28, lead 37, motor frame 10', and lead 39, to the lead 44 which connects with the shank 16' of the armature 16; thence through the armature and the core 13' of the magnet 13 to the frame 8, and from said frame, back to the battery by the lead 35. The warning disk 3 now rotates until the stop pin 29 contacts with the drawn in armature 16, and thus the word "Stop" is displayed. The green light circuit is the same as before described.

The circuits established by the button R are, from the battery by the leads 31 and 32 to the button; thence by the lead 45 to the magnet 14; from the magnet, by the lead 46 to the bottom plate 8' of the frame 8, and from the frame through the lead 35 back to the battery. The armature 17 being thus attracted to the magnet 14, the motor circuit is closed through the leads 31 and 36 to the brush 27; thence through the motor disk 25, brush 28, lead 37, motor frame 10' and lead 39 to the lead 44; thence by a lead 47 to the shank 17' of the armature 17; thence through the core 14' of the magnet to the frame 8 and back to the battery through the lead 35. The warning disk 3 now rotates until the stop pin 29 contacts with the drawn in armature 17, and the word "Right" is displayed. The green light circuit is the same as before described.

The motor break and the light break in the cases of the buttons S and R, are the same as the breaks described in connection with the button L. The red light T is operated in usual manner direct from the battery. I have indicated this in Fig. 7 by the battery leads 31 and 35, and the lead 48.

I claim:—

1. A warning-indicator for vehicles comprising a case having a sight opening; an inscription-bearing disk within the case, turnable on its axis to cause its inscriptions to appear behind the sight-opening; a lamp carried by the case; an electric motor in the case carrying the inscription disk; push buttons corresponding with the inscriptions on the disk; electric circuits to operate the motor from the push buttons; means controlled by said circuits for varying the movement of the disk conformably to the circuit operating it, the same comprising a plurality of coils, an armature for each coil, and a stop pin carried by the inscription bearing disk and traveling in a path which is free when the armatures are away from their coils, but is obstructed by said armatures when they are attracted to their coils; and electric circuits operated by the push buttons and controlled by said coils for lighting the lamp coincidently with the operation of the inscription disk.

2. A warning-indicator for vehicles comprising a case having a sight opening; an inscription bearing disk within the case, turnable on its axis to cause its inscription to appear behind the sight-opening, said disk being counter-balanced to return to normal position by gravity; electrically controlled connections for turning the disk on its axis; means operated by said connections to define the length of movement of the disk whereby its inscriptions are selectively presented at the sight opening comprising a plurality of coils, an armature for each coil, and a stop pin carried by the inscription bearing disk and traveling in a path which is free when the armatures are away from their coils, but is obstructed by said armatures when they are attracted to their coils; and means for automatically breaking the circuits of said electrical connections at the limit of movement of the disk to permit it to return to normal by gravity.

3. A warning-indicator for vehicles comprising a case having a sight opening; an inscription bearing disk within the case, turnable on its axis to cause its inscription to appear behind the sight opening, said disk being counterbalanced to return to normal position by gravity; electrically controlled connections for turning the disk on its axis; means operated by said connections to define the length of movement of the disk whereby its inscriptions are selectively presented at the sight opening comprising a plurality of coils, an armature for each coil, and a stop pin carried by the inscription bearing disk and traveling in a path which is free when the armatures are away from their coils, but is obstructed by said armatures when they are attracted to their coils; means for automatically breaking the circuits of said electrical connections at the limit of movement of the disk to permit it to return to normal by gravity; and a lamp carried by the case, and operated by the electrical connections including said coils coincidently with the operation of the inscription disk.

4. A warning-indicator for vehicles comprising a case having a sight opening; a disk within the case having perforated inscriptions, a lamp carried by the case, a reflector and an opalescent glass arranged to illuminate the perforated inscriptions; means to rotate the disk on its axis; means to control said rotation to selectively present any of the inscriptions of the disk at the sight openings; and means to operate the lamp contemporaneously with the operation of the inscription disk.

5. A warning-indicator for vehicles comprising a case having a sight opening; a disk within the case having perforated inscriptions; a lamp carried by the case, said lamp having over its outer face a distinctive color screen; a reflector within the case to receive the white light of the lamp and an opalescent glass to receive the reflected rays and illuminate the perforated inscription; means to rotate the disk on its axis; means to control said rotation to selectively present any of the inscriptions of the disk at the sight opening; and means to operate the lamp contemporaneously with the operation of the inscription disk.

In testimony whereof I have signed my name to this specification in the presence of two subscribing witnesses.

FRANK TRIEST.

Witnesses:
Wm. F. Booth,
D. B. Richards.